United States Patent [19]
Orser

[11] 3,928,394
[45] Dec. 23, 1975

[54] BENZYL AND (BENZYL)BENZYLANTHRAQUINONES
[75] Inventor: David A. Orser, Liverpool, N.Y.
[73] Assignee: General Electric Company, Portsmouth, Va.
[22] Filed: Jan. 11, 1973
[21] Appl. No.: 322,636

[52] U.S. Cl. ................................................. 260/369
[51] Int. Cl.$^2$ ........................................ C07C 49/68
[58] Field of Search ..................................... 260/369

[56] References Cited
UNITED STATES PATENTS
3,715,494   1/1973   Perlowski ....................... 178/17.5 D Primary Examiner—Lorraine A. Weinberger
Assistant Examiner—Jane S. Myers
Attorney, Agent, or Firm—F. Wesley Turner; Joseph T. Cohen; Stanley C. Corwin

[57] ABSTRACT

Benzyl and (benzyl)benzylanthraquinones are new chemical compounds which are useful stabilizers for light-valve fluids.

4 Claims, No Drawings

BENZYL AND (BENZYL)BENZYLANTHRAQUINONES

This invention relates to benzylanthraquinones and (benzyl)benzylanthraquinones, having the formula

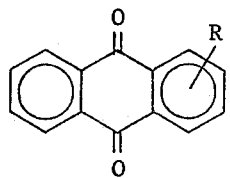

where R is $C_6H_5$—$CH_2$— or $C_6H_5$—$CH_2$—$C_6H_4$—$CH_2$—. In the process of making these compounds, both the compounds where R is in the 1-position and in the 2-position are formed. Likewise, when R is $C_6H_5$—$CH_2$—$C_6H_4CH_2$— the benzyl group can be on the o-, m- or p-position of the benzyl group attached to the anthraquinone ring. Of all the possible isomers the easiest to prepare in highest overall yield and purity are 2-benzylanthraquinone and 2-(p-benzyl)benzylanthraquinone.

All of the anthraquinones corresponding to the above formula are useful as stabilizers to prevent substrate formation in the fluid used in light-valves as disclosed and claimed in my formerly copending application Ser. No. 322,639, now U.S. Pat. No. 3,764,549; filed concurrently herewith and assigned to the same assignee as the present invention. It is hereby incorporated by reference as a teaching of the utility of the compounds of this invention. However, the anthraquinones of this invention can also be used for the same purposes as the anthraquinones of the prior art, for example to make dyes.

In order that those skilled in the art can readily understand my invention the following examples are given by way of illustration and not by way of limitation. Temperatures are in degrees Centigrade. Where percentages are given, they are by weight. Where elemental analyses are reported the theoretical values are given in parentheses.

EXAMPLE 1

1,440 g. of 9,10-dihydroanthracene were heated to 125°–135° under nitrogen. From two separate addition funnels, 1,730 g. of benzyl alcohol and 2,450 g. of polyphosphoric acid were added dropwise — the acid required 4 hours and the alcohol 5 hours. Without further heating, the mixture was cooled to 120° and transferred to a separatory funnel. After removing the acid layer, the organic layer was washed twice with 1 l. of methanol and filtered. On distilling in a molecular still, a fraction boiling at 169°–191° at 13–17 microns was collected with nmr spectroscopy showed to be 26.5% 1-benzyl-9,10-dihydroanthracene and 73.5% 2-benzyl-9,10-dihydroanthracene. This fraction, weighing 658 g., was redistilled at 20 microns, into 8 cuts. By nmr spectroscopy, cut 3 was shown to be 41.7% of the 1-benzyl isomer and 58.3% of the 2-benzyl isomer and cut 6 was 30% of the 1-benzyl and 70% of the 2-benzyl isomer. Cuts 3, 4 and 5 which had been collected between 166° and 177°, were combined and distilled at 30–40 microns. Cut 3, boiling at 165°–166° at 35 microns, weighed 27 g., and was identified as 1-benzyl-9,10-dihydroanthracene by nmr spectroscopy. It was a liquid having a refractive index of $n_D^{25} = 1.6260$. A solution of 8 g. of this product in 40 ml. of benzene and 200 ml. of 15% aqueous nitric acid were refluxed overnight. After separating the acid layer, the organic layer was evaporated to near dryness. The semi-solid was recrystallized from a benzene-methanol mixture to yield 1.8 g. of bright yellow needles, m.p., 153°–154°. After recrystallizing again, nmr spectroscopy showed that the product was 1-benzylanthraquinone.

EXAMPLE 2

A mixture of 180 g. of 9,10-dihydroanthracene and 154 g. of polyphosphoric acid was heated under nitrogen to 155°–160°. Over a period of 2.5 hours, 108 g. of benzyl alcohol were added and the solution heated for an additional 2 hours. The mass solidified on cooling and was dissolved in 600 ml. of diethyl ether and washed with 3–300 ml. portions of water. Evaporation of the ether gave an oil which was washed with ethanol. On distillation, the fraction boiling at 150°–170° at 40–45 microns was collected. It weighed 20.8 g. After pressing on a porous clay plate, the solid was recrystallized from methanol to give 4.8 g. of white crystals, m.p. 76°–77° which was identified by IR, nmr and mass spectroscopy as 2-benzyl-9,10-dihydroanthracene. Analytical data C, 92.97 (93.29); H, 6.84 (6.71).

A solution of 4 g. of 2-benzyl-9,10-dihydroanthracene in 20 ml. of benzene and 80 ml. of 20% aqueous nitric acid were refluxed 64 hours. After removal of the acid layer, washing with aqueous sodium bicarbonate and then water, the organic layer was filtered through solid anhydrous sodium sulfate and evaporated to dryness. Several recrystallizations from benzene-methanol gave yellow crystals, m.p. 133°–136°., which was identified as 2-benzylanthraquinone by nmr spectroscopy. Analytical data, C, 83.15 (84.5); H, 4.43 (4.73).

EXAMPLE 3

A mixture of 2,520 g. of diphenylmethane, 510 g. of anhydrous zinc chloride and 609 g. of 37% aqueous formaldehyde was warmed to 50° and 606 g. of acetyl chloride added slowly with stirring. The temperature slowly rose to ca. 83° during the addition and then held constant. The mixture was washed with 50 ml. of 60°–90° ligroin. The separated aqueous phase was extracted with 200 ml. of ligroin and the latter added to the organic layer. After washing with water and 5% aqueous potassium hydroxide, drying with anhydrous sodium sulfate, the organic layer was decolorized with charcoal and diatomaceous earth and filtered. Fractional distillation at 10–20 microns gave 597 g. of a liquid mixture ($n_D^{25} = 1.5864$) of chloromethylated diphenylmethane which nmr spectroscopy showed to be 79% of the p-isomer, 16% of the o-isomer and the balance an unidentified impurity.

A mixture of 900 g. of 9,10-dihydroanthracene, 1,684 g. of cyclohexane and 8.1 g. of anhydrous ferric chloride was heated to reflux under nitrogen and 217 g. of the above chloromethylated product added over a 2 hour period. Heating was continued an additional 2 hours, after which ca. 1 l. of benzene was added. The mixture was washed with two 2 l. portions of 10% aqueous hydrochloric acid and two 1 l. portions of water and then dried over anhydrous potassium carbonate.

After removal of the solvent, 192 g. of the crude product distilled at 230°–240° at 25 microns. After two crystallizations from a 10–90 mixture of benzene and methanol, 101 g. of 2-(p-benzyl)benzyl-9,10-dihydroanthracene was obtained having a m.p. of 89°–90°.

A solution of 50 g. of the above product in 150 ml. of benzene and 1 l. of 15% aqueous nitric acid were refluxed for 1.5 – 2 hours. After washing with 2 – 500 ml. portions of water and drying with anhydrous potassium carbonate, the product was chromatographed on an alumina column and crystallized from 30–70 benzene-methanol. A yield of 7 g. of 2-(p-benzyl)benzylanthraquinone was obtained having a m.p. of 138°–145°C. whose structure was confirmed by nmr spectroscopy. Further purification yields a product melting at 144°–148°. Analytical data C, 86.40 (86.57); H, 5.13 (5.19); O, 8.57 (8.24).

The above products were all found to stabilize a polybenzyltoluene fluid against substrate formation when irradiated with an electron beam.

I claim:

1. A chemical compound having the formula

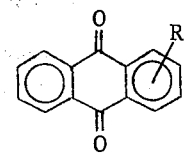

where R is $C_6H_5-CH_2-$.

2. The compound of claim 1, named 1-benzylanthraquinone.

3. The compound of claim 1, named 2-benzylanthraquinone.

4. The compound named 2(p-benzyl)-benzylanthraquinone.

* * * * *